United States Patent [19]
Nishida et al.

[11] 3,882,713
[45] May 13, 1975

[54] DEVICE FOR MEASURING SENSUOUS DEGREE OF ODOR

[75] Inventors: Kazuko Nishida, Shiga-ken; Kazuji Bota, Ohmihachiman; Tadao Ando, Kusatsu, all of Japan

[73] Assignee: Nippon Airwick Service Co., Ltd., Ohmihachiman-shi, Japan

[22] Filed: June 18, 1973

[21] Appl. No.: 371,114

[52] U.S. Cl. ................................................. 73/23
[51] Int. Cl. .......................................... G01n 31/00
[58] Field of Search ............ 73/23, 23.1; 23/232 R, 23/254 R; 128/185, 198, 206

[56] References Cited
UNITED STATES PATENTS

| | | |
|---|---|---|
| 2,136,844 | 11/1938 | Fair et al. ................................ 73/23 |
| 2,837,912 | 6/1958 | Moncrieff ................................ 73/23 |
| 2,950,618 | 8/1960 | Lewis ....................................... 73/23 |
| 3,140,156 | 7/1964 | Koh ................................ 23/254 R X |
| 3,618,359 | 11/1971 | Randebrock et al. .................. 73/23 |
| 3,686,930 | 8/1972 | Kniebes et al. ..................... 73/23 X |

Primary Examiner—Richard C. Queisser
Assistant Examiner—Stephen A. Kreitman

[57] ABSTRACT

A device for measuring sensuous degree of odor, by blowing to the human nostrils alternatingly and maintaining a definite time interval, non-odorous air and odorous air which has been diluted with non-odorous air, and varying the concentration of odorous component in said odorous air in order to record the smelling point and non-smelling point, thereby controlling the temperature and humidity of air being subjected to testing to certain constant values.

2 Claims, 2 Drawing Figures

DEVICE FOR MEASURING SENSUOUS DEGREE OF ODOR

This invention relates to a device for measuring the sensuous degree of odor.

It is an apparent fact that rational measurement and evaluation for the odor, especially for offensive odor hazard are the most important and fundamental conditions for establishing regulation standards and prevention measures for controlling offensive odors. However, conventional methods employed so far present a serious drawback, and no objective measuring system for the odor has yet been established. Conventional methods of measuring odor can be grouped into two; one is based on a device or wet-type analysis in order to indicate the odor in terms of a concentration of a particular identifiable component in air, and the other is a functional test by using an injection cylinder, glass vessel, or a flexible bag, and diluting the odorous air stepwise (usually in multiple relation) in order to indicate the degree of odor by means of dilution ratio required until no sensitive odor is felt or smelt. With the former method, however, the following drawbacks have been pointed out. That is, ordinary offensive-odor hazard is a result of total odor in which a variety of low-concentration odor components are mixed to reinforce or offset, presenting a particular odor. And usually it is not proper to indicate the odor based on the concentration of a particular identifiable component which is taken out of many components producing odor. And in many cases, the concentration of such a particular component has no relation to the degree of discomfort caused by the odor. Moreover, the presence of certain components in the odor-constituting components may change greatly the degree of sensuous discomfort even where their concentration may be very small compared to other components. Not only certain such low-concentration components but also the same component of different concentration cause to vary the color or feeling of the odor, making the smelling phenomenon complex, from which many hypotheses concerning smelling have been proposed. Therefore, indication based on the concentration of a particular odorous component, i.e., sensuous quantity, is not appropriate at all for concretely indicating the odor itself which greatly depends on psychological factors. On the contrary, the latter functional testing method which determines the degree or odor based on the human sense of smell, allows indication which is closely related to the degree of discomfort due to odor, and is hence very practicable. However, the functional testing method employed so far still presents a serious drawback, it is not possible to reproduce the measured results, or to make any objective and concrete numerical indication. Accordingly, with the conventional functional testing method, it is not allowed to compare the measured results. For example, in the method of brine equilibrium method or vapor dilution method in which the odorous air is passed through the brine or distilled water and the water is diluted until no odor is smelt, only odorous components which are soluble in brine or distilled water are measured. In short, odorous components such as olefins and aromatic hydrocarbons, are not captured by these solvents. This is nothing but that the measured components are not identical to the original odorous components; this should be a fatal drawback. In addition, solubility of these components in the solvent depends greatly on requirements such as temperature and contacting time. Saturation vapor pressure of these components to the solvent differs greatly too. Accordingly, measured results will be dominated by the kinds and concentration of the components rather than the degree of odor.

In effect, it is required to stop the passing of odorous air before the total components reaches the saturation in solvent. But there is no method of determining when to stop the passing of odorous air for individual components. Furthermore, the sense of smell of a person carrying out the measurement will be affected considerably by the temperature and humidity in open air. With the dilution method by capturing the odor in the liquid and having a drawback as mentioned above, reliability of the measured result is very poor. Even different concentrations of odorous components at the time of measurement will often appear as being equal dilution ratio. Hence such a dilution method cannot provide objective measurement of the odor.

The air-dilution method which dilutes the odorous air by using an injection cylinder, etc. has often been used on account of their simple operation. But this method has a serious drawback. That is, a small amount of odorous air is taken in an injection cylinder and is diluted to a specified amount of non-odorous air (usually filtered through the activated carbon layer). In this case, errors (about ± 5 percent) inherent to the injection cylinder itself and the adsorption loss in the inner surface of the injection cylinder will have been developed. And variation in concentration of odorous component, after the dilution, due to said causes will increase as the dilution step advances. Especially, adsorption losses due to vaseline and silicone grease which have been applied for the purpose of preventing the leakage of air of the pump, is not negligible. Furthermore, since the velocity of odorous molecules passing through the nostrils greatly affects the sense of smell, method of blowing a dilution sample by pushing the injection cylinder by hand, tends to develop measuring errors. But since the air-dilution method is simple in manipulation, rough estimation that how much dilution will be required until the odorous air in the site of offensive-odor becomes non-odorous, can be obtained advantageously compared to the analysis method. But there has been reported that actual measurement with this method air-dilution produces considerable dispersion in the measured results caused by the difference in the sensing ability for odor of a person being tested (person taking measurement), i.e., personal difference. Dispersion in the measured results obtained with the air-dilution method will be caused mainly by the fact that the odor is smelt more keenly when turning from the non-odorous state to the odorous state rather than when the odorous state turns to non-odorous state, errors due to the above-mentioned dilution, and by the fact that effects due to atmospheric conditions have not at all been taken into consideration. Personal difference in sensing the odor is rather small. One serious problem of the air-dilution method having such drawbacks is that it is not allowed to indicate the measured results in such a form as to correspond to the concentration of the odorous components, and comparison for other kinds of odor is not possible.

This invention relates to a device for measuring the degree of odor overcoming the above-mentioned serious drawbacks inherent to the conventional odorous air measuring methods. The functions of the device of this invention can be summarized as follows:

Odorous air can be added continuously to the nonodorous air and the amounts and rate of addition can be controlled freely.

Diluted odorous air, i.e., odorous air added continuously to the non-odorous air, can be blown to the nostrils at a definite rate, and the blowing rate can be controlled freely.

Odorous air is added at a definite rate to the stream of non-odorous air and the concentration of the odorous air is increased until a person being tested feels the point of smelling. After the smelling point has been reached, the amount of odorous air being added is reduced continuously until the person being tested feels the point of non-smelling. Such "continuous repeated test" between the smelling point and the non-smelling point, in other words, a back test, can be conducted continuously. Adjustment of adding the odorous air and the number of back test can be set freely.

Amount and rate of the odorous air, and the smelling point and the non-smelling point judged by the person being tested, can be recorded continuously.

To prevent the sense of smell of the person from being tired, diluted odorous air (sample) and non-odorous air are blown alternatingly from the mask of the person being tested maintaining a definite time interval.

Temperature and humidity in air subjected to the testing (including non-odorous air for preventing the sense of smell from being tired), can be set freely, and temperature and humidity conditions can be recorded continuously.

Degree of discomfort possessed by the odorous air can be indicated in terms of a concentration of a certain odorous component. It is very easy to compare the degree of discomfort due to different odors. This comparison can be made easily by performing the sensuous measurements with a certain odorous component as a reference under the constant temperature and humidity conditions, thereby indicating the values representing the concentration of the reference component for the uncomfortable odors by using the device of this invention.

A person testing the offensive-odor hazard should be an ordinary person having normal ability of sensing the smell. Hence it is not proper, in determining the degree of discomfort due to offensive smell or regulation for controlling such offensive smell, to make evaluation based on specially trained smell-sensing panel. It is not important that evaluation and judgement based on the smell-sensing measurement obtained from ordinary persons including sufferers and those who caused offensive smell, be reproduced with high fidelity. And measurements taking these matters into consideration can be performed easily with the device of this invention.

Referring now to the accompanying drawings.

Figure 1:
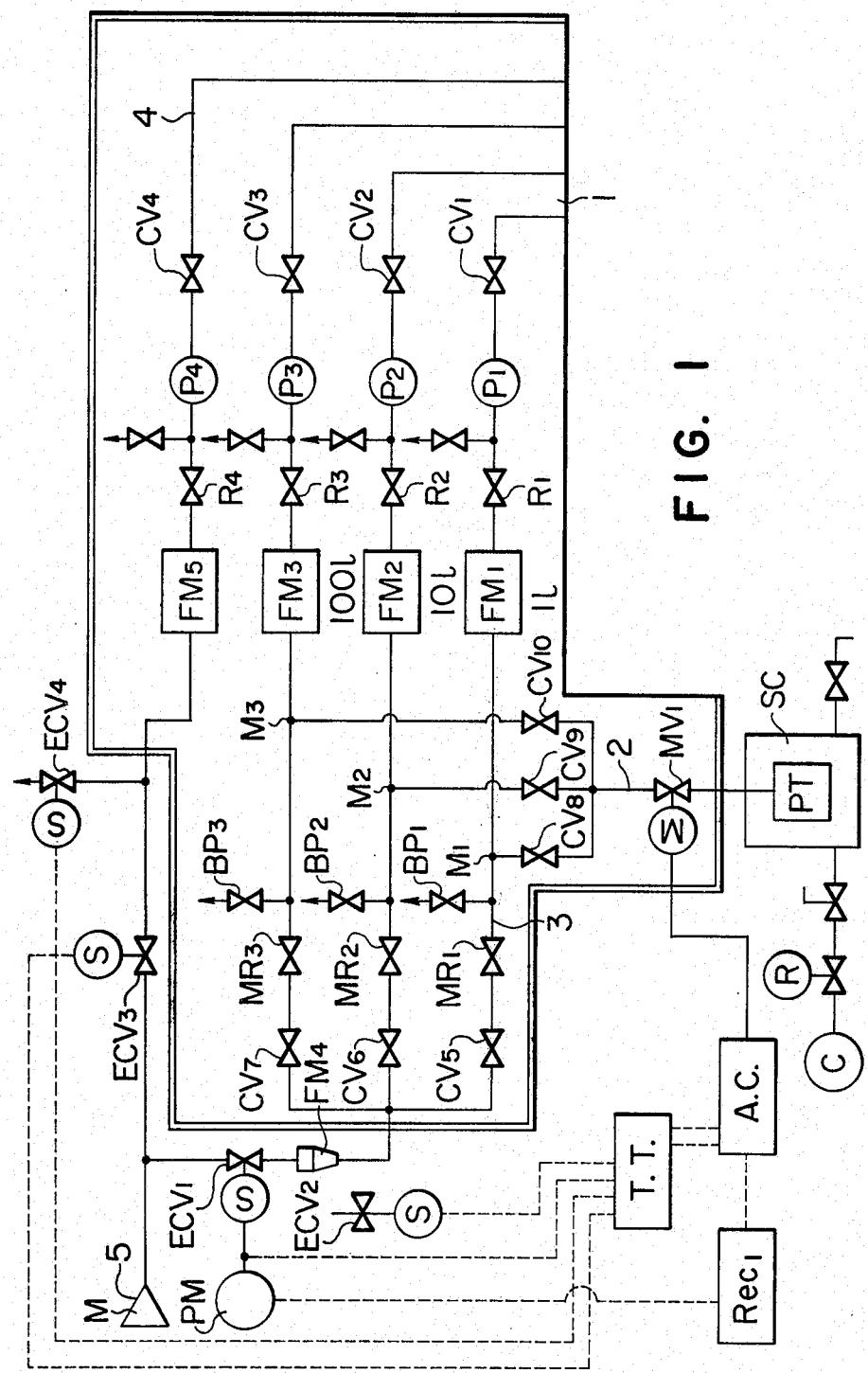
FIG. 1 is a schematic diagram showing the device of measuring sensuous degree of odor in accordance with this invention.

A device for continuously measuring the degree of odor in accordance with this invention, is illustrated below with reference to FIG. 1. The device is constituted by the dilution purpose non-odorous air stream system 1, offensive odorous air stream system 2, mixed air stream system 3, non-odorous air stream system 4 for preventing the sense of smell from being tired, and measurement mask system 5. Non-odorous air for dilution purpose is fed through switching valves $CV_1$, $CV_2$ and $CV_3$ to individual paths by means of pumps $P_1$, $P_2$ and $P_3$, and is adjusted to a definite flow rate (e.g., 1 liter/min, 10 liter/min, and 100 liter/min) by means of flow-rate controllers $R_1$, $R_2$ and $R_3$, and then reaches the mixing portions $M_1$, $M_2$ and $M_3$. Sample of offensive odor is packed in a flexible bag PT, introduced into sample container SC, and connected to the offensive odor stream system. In the offensive odor stream system, in order to prevent the adsorption loss of offensive odor components due to rubber, etc. and to always maintain uniformly small amounts of flowing, an air compressor C is used to give a definite compression to the sample container SC, so that offensive odor in the bag can be expelled toward the stream system. Offensive odor stream system is connected by valves $CV_8$, $CV_9$ and $CV_{10}$ to the mixing portions $M_1$, $M_2$ and $M_3$ where offensive odor stream will be mixed with dilution purpose non-odorous air. Moreover, in the offensive odor stream system is installed a motor valve $MV_1$ which during any time period, increases and decreases continuously the flowing rate at a definite changing rate within a certain flow-rate range (e.g., 0.1 liter/min - 1.0 liter/min), and at the same time being recorded by the recorder $Rec_1$. In this way, the dilution ratio of the odorous air of which amount being continuously increased or decreased, with respect to the non-odorous air flowing at a definite rate, changes continuously. Flow-rate fine controllers $MR_1$, $MR_2$ and $MR_3$ and valves $CV_5$, $CV_6$ and $CV_7$ are provided in order to secure a definitely mixed air stream for each dilution step being obtained from the mixed air of which rate of odorous content varying continuously. Thus, a definite amount of mixed air is fed to the mask being used by a person performing testing. Excess of mixed air is drained out of the system through bypasses $BP_1$, $BP_2$ and $BP_3$. A mixed air fed at a definite flow rate is checked through the air flowmeter $FM_4$, and blown at a definite rate from the mask M of a tester through the electromagnetic valve $ECV_1$. On the other hand, non-odorous air conveyed by the pump $P_4$ through switch valve $CV_4$ is adjusted to a definite flow rate through a flow-rate controller $R_4$, and reaches the electromagnetic valve $ECV_3$ through the flowmeter $FM_5$. Electromagnetic valves $ECV_1$ and $ECV_3$ are opened or closed alternatingly maintaining a definite time period by means of twin timer TT. After a mixed air of offensive odor has flown for a definite period, the valve $ECV_1$ is closed, and instead, the valve $ECV_3$ is opened to blow non-odorous air at a definite flow rate from the mask of a testing person, so that the sense of smell can be prevented from being tired. While the electromagnetic valves of the mixed air system and non-odorous air system are being closed, the valves $ECV_2$ and $ECV_4$ will be open so that air is exhausted out of the system, thus eliminating variation in flowing rate. Also, while the electromagnetic valve $ECV_1$ of the mixed air system to which will be added offensive odor, is being closed, the operation of the motor valve $MV_1$ of the offensive odor stream system will be stopped for a while, so that the dilution ration will not be affected by the mixed air. With the above-mentioned odor dilution mechanism, it is made possible to obtain a variety of desired combinations of dilution ratios simply by allowing the non-odorous air and the offensive odorous air to flow through the switching valves ($CV_1$ and $CV_5$, $CV_2$ and $CV_6$, $CV_3$ and $CV_7$, and $CV_8$, $CV_9$, $CV_{10}$). As mentioned in the foregoing, the amount of offensive odorous air increasing or decreasing continuously at a definite rate, is added to the non-odorous air flowing at a definite rate. Hence the testing person when a smell of odor is felt or when the smell vanished, may operate the push marker PM so that the flow-rate of offensive odor is automatically recorded by the recorder. According to the device of this invention, the sense of smell of a testing person can be prevented from being tired simply by allowing the non-odorous air and odorous air to flow from the mask M alternatingly, the mixed air of any dilution ratio can be blown from the mask at a definite rate and measured, and dilution or condensation of offensive odor can be carried out continuously and repeatedly. By increasing or decreasing the rate of addition of odorous air to the non-odorous air, it is possible to continue the testing until certain values of feeling the smell (smelling point) or feeling no smell are obtained from many persons being tested. In general, it is a common concept that the sense of smell is keen for the smelling point rather than the smell-vanishing point. Accordingly, it will be doubtless that the method of this invention which permits the measurement of both points is very effective, and such a "back test" of this invention will help markedly increase the reliability of measurement.

Next, the human sense of smell depends greatly on the atmospheric conditions such as temperature and humidity in air. It is a common concept that the sense of smell is most keen when the temperature of air is around 25°C and the humidity is 60 – 70 percent, and even a small variation of temperature and humidity from the above values greatly deteriorates the sense of smell. From these reasons, correction or modification of measurements taking the atmospheric conditions of the odorous air and at the time of measurement into consideration, will be required for the sensuous measurement of odor.

With a temperature-humidity control unit provided to the device of this invention, measurement of odor can be carried out easily under constant temperature and humidity conditions. That is, degree of odor measured in an actual site of offensive odor under a variety of atmospheric conditions can be modified and indicated in terms of values under constant of definite temperature-humidity conditions; it is very rational and easy to make comparison for the degree of odor even in cold or hot season, or under heated or wet conditions.

Figure 2:
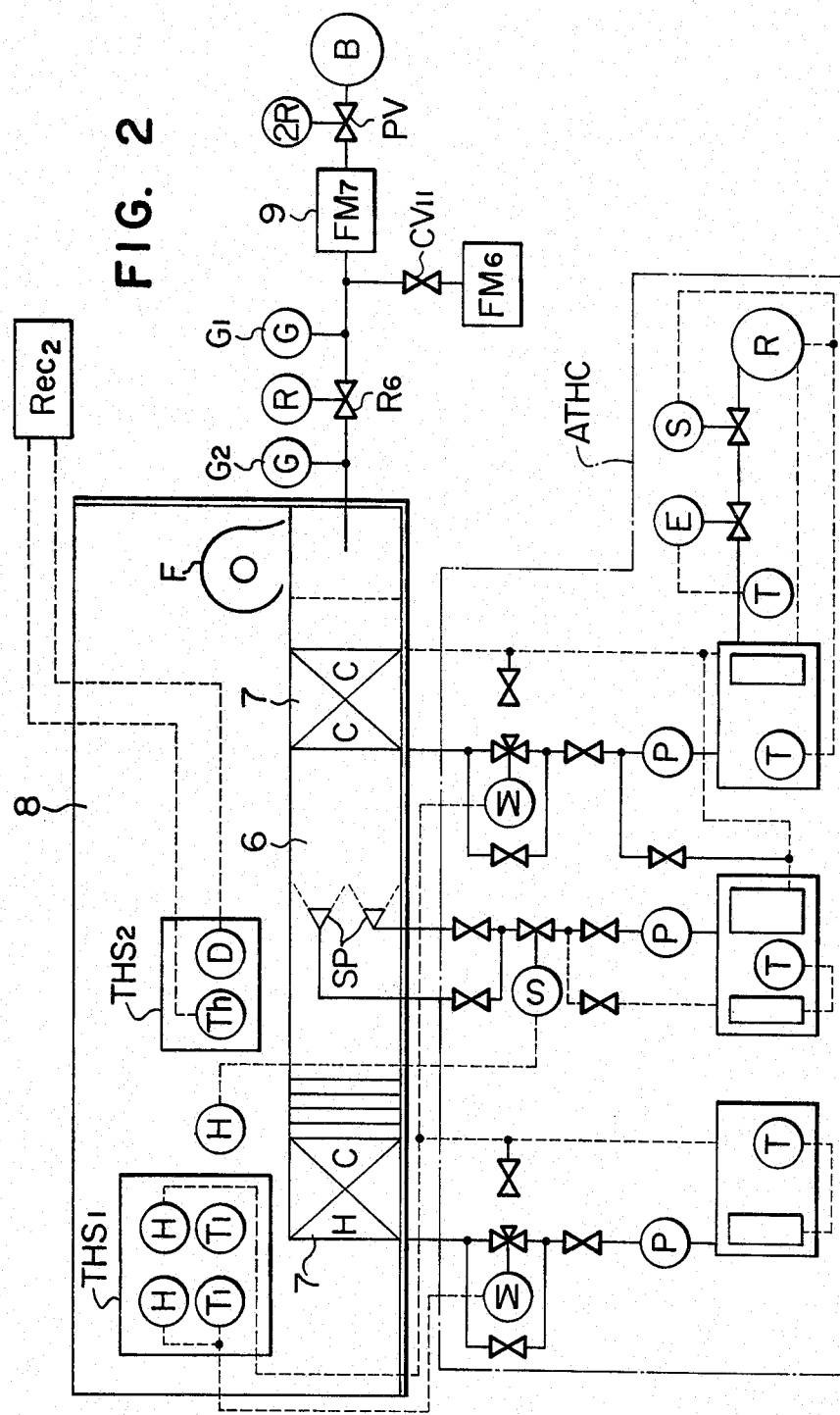
FIG. 2 is a schematic diagram showing the temperature-humidity control unit used in the device of this invention.

The temperature-humidity control unit consists as shown in FIG. 2 of wetting portion 6, temperature adjusting portions 7, 7 moisture-and-temperature controlling device ATHC, constant temperature-moisture vessel 8, air-stream cycling and stirring fan F, automatic recorder Rec 2 for controlled temperature and humidity, and non-odorous air supply portion 9. Non-odorous air composed of 21 percent oxygen and 79 percent nitrogen after having passed from the cylinder B (6 $m^3$) through the pressure-reducing valve PV and flowmeter $FM_7$, is controlled finely for its flowing quantity and pressure through the regulator $R_6$, and the blowing pressure and the flow-in pressure are checked by the meters $G_1$, $G_2$. Also, path, switching valve $CV_{11}$ and flowmeter $FM_6$ branched from the stream are for the purpose of diluting the odorous air stored in the flexible bag. Thus, non-odorous air from the cylinder is adjusted through the wetting portion 6 and temperature-controlling portions 7, 7 to a predetermined temperature and humidity, and is stored in the constant-temperature-humidity vessel 8. The content of the vessel is about 2 $m^2$, and the air contained therein is stirred and mixed by a fan. Control ranges of temperature is from 0° to 40°C ($\pm$ 0.5°C), and humidity is from 20 to 100 percent ($\pm$ 5 percent), and are controlled and maintained by the functions of an automatic control mechanism A.T.H.C. connected to the cooling coils C, C and heating coils HC of the temperature-controlling portion 7, spray SP of the wetting portion 6, and the sensing portion $THS_1$ for sensing temperature and humidity in the vessel. The temperature and humidity in the vessel are sensed by the sensing portion $THS_2$ and are recorded in the automatic recorder Rec2. By linking the above constant-temperature-humidity vessel 8 of the temperature-humidity control unit to the non-odorous air stream system of the device for continuously measuring the dilution ratios, in order to dilute the odor with non-odorous air which has been adjusted to a definite temperature and humidity conditions, it is very easy to measure the sense of odor. The features of the device of this invention are innovative and cannot be found from the conventional functional test, thereby solving a problem which is the most important in performing the sensuous measurement of odor.

Example of measuring the odor by using the device of this invention:

Table I shows an example of measurement of the sense of odor obtained by using the device of this invention, with offensive odor such as ethylmethyl mercaptan as a sample. Person being tested should be a sufferer of offensive-odor hazard or an ordinary person, not these specially trained "smell-sense panel". Hence in this example, ordinary persons were tested. Measurements were performed when outdoor conditions are 18°C of atmospheric temperature and 70 percent of humidity, thereby adjusting the temperature of the odor sample to 22°C and humidity to 55 percent. Values of smell point and non-smell point in this Table represent from top to bottom measurements taken just after the preparation of sample, and two hours after the preparation of sample. As will be clear from Table, personal difference is very small. Such measurement results could never be anticipated from the conventional methods.

Table I

| Example of Measurement (Atmospheric Temp. 18°C., Humidity 70%) | | | | | | | |
|---|---|---|---|---|---|---|---|
| Person Tested | | | Measuring Condition | | | Odorous Air Flow — Rate l/min | |
| Sex | Age | Occupation | Temp. °C | Himidity % | Non-odorous air flow-tate l/min | Non-smell | Smell |
| | | | | | | Smell point | Non-smell point |
| Male | 25 | Public Official | 22 | 55 | 13.0 | 0.50 | 0.80 |
| | | | | | | 0.50 | 0.80 |
| | | | | | | 0.50 | 0.80 |

Table I—Continued

Example of Measurement (Atmospheric Temp. 18°C., Humidity 70%)

| Person Tested | | | Measuring Condition | | | Odorous Air Flow — Rate l/min | |
|---|---|---|---|---|---|---|---|
| | | | | | | Non-smell | Smell |
| Sex | Age | Occupation | Temp. °C | Himidity % | Non-odorous air flow- tate l/min | Smell point | Non-smell point |
| Female | 22 | Student | 22 | 55 | 13.0 | 0.70 | 0.90 |
| | | | | | | 0.60 | 0.80 |
| | | | | | | 0.70 | 0.90 |
| Female | 23 | Unem-ployed | 22 | 55 | 13.0 | 0.65 | 0.85 |
| | | | | | | 0.65 | 0.80 |
| | | | | | | 0.60 | 0.85 |
| Female | 22 | Unem-ployed | 22 | 55 | 13.0 | 0.60 | 0.80 |
| | | | | | | 0.55 | 0.85 |
| | | | | | | 0.55 | 0.85 |

What is claimed is:

1. A device for measuring sensuous degree of odor comprising at least two first conduit means for flowing non-odorous air, means for flowing said non-odorous air at a predetermined flow rate, a source of odorous air, second conduit means connected to one of said first conduit means for adding the odorous air from said source to the flowing non-odorous air, means for controlling continuously the amount of odorous air to be added to the flowing non-odorous air, means for automatically recording the amount of added odorous air, third conduit means for the odorous air-containing air extending from said first conduit means for non-odorous air, a mask connected to the other first conduit means for non-odorous air and said third conduit means for odorous air-containing air, means for discharging the non-odorous air and odorous air-containing air alternately at a predetermined time interval, through said mask into the nostrils of a person determining the point when an odor is smelled and when the odor is not smelled, and means for recording the amount of odorous air added at the smelling point and at the non-smelling point.

2. A device for measuring sensuous degree of odor according to claim 1, which comprises means connected to said first conduit means for controlling the temperature and humidity of said non-odorous air.

* * * * *